UNITED STATES PATENT OFFICE.

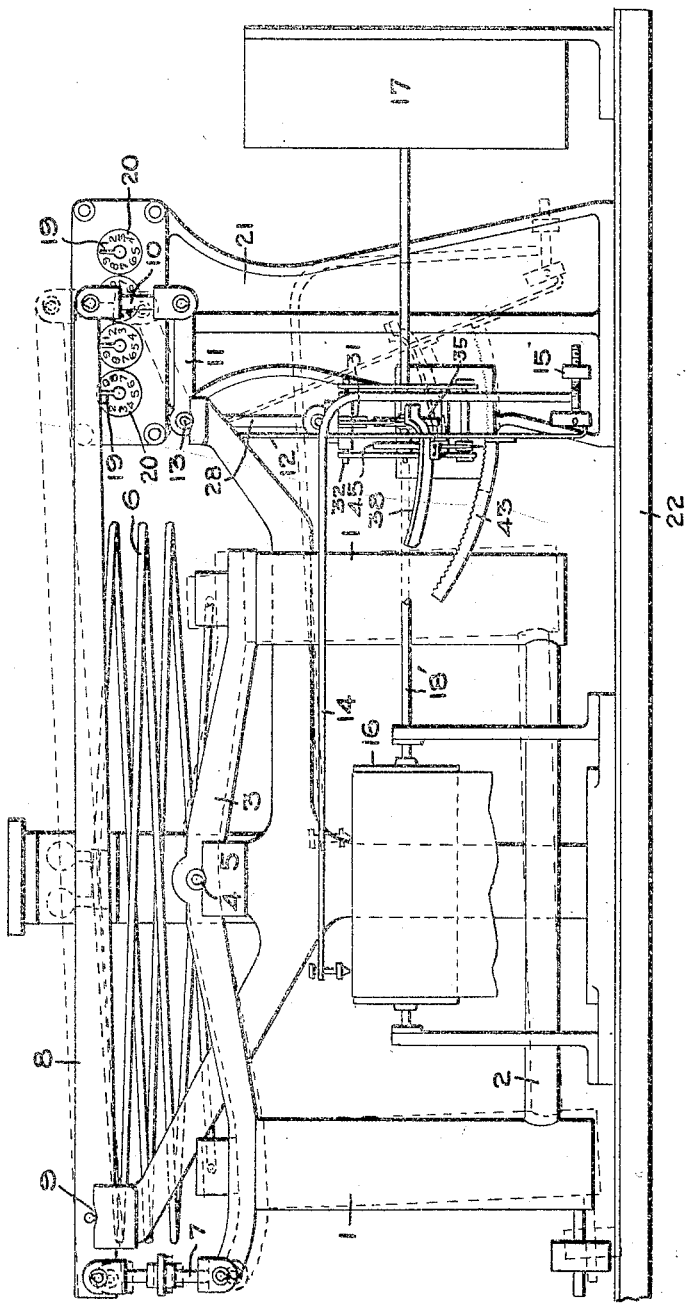

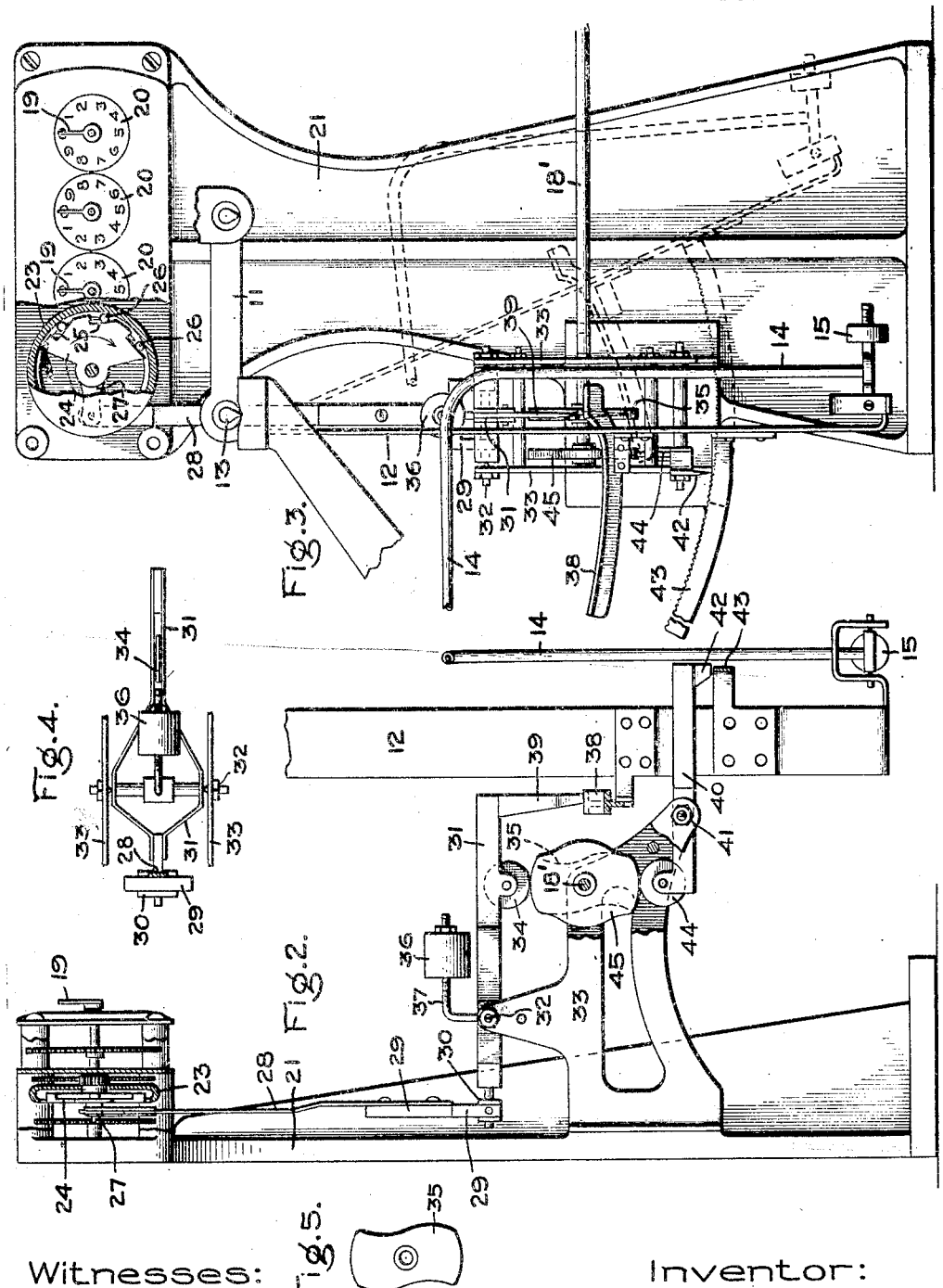

AUSTIN R. DODGE, OF SCHENECTADY, NEW YORK, ASSIGNOR TO GENERAL ELECTRIC COMPANY, A CORPORATION OF NEW YORK.

INTEGRATING MECHANISM FOR FLOW-METERS.

1,155,303.  Specification of Letters Patent.  Patented Sept. 28, 1915.

Application filed July 29, 1911. Serial No. 641,241.

*To all whom it may concern:*

Be it known that I, AUSTIN R. DODGE, a citizen of the United States, residing at Schenectady, county of Schenectady, State of New York, have invented certain new and useful Improvements in Integrating Mechanism for Flow-Meters, of which the following is a specification.

This invention relates to an improved apparatus for integrating the flow of a fluid in a conduit, as measured by a suitable meter. For the purpose of illustration, the integrating mechanism is shown as applied to that type of flow meter claimed in my pending application filed September 25, 1909, Serial No. 519,526. To the indicating and recording mechanism of that instrument I have now added said integrating mechanism, so that the total flow of steam or other fluid measured can be easily read from the dials of said mechanism. The integrating mechanism can, however, be used with other meters than the one illustrated.

Briefly stated, the flow meter of said application comprises a nozzle plug inserted in the steam main and establishing in two pipes a pressure difference proportional to the mean velocity of the steam. This pressure difference is communicated to the two legs of a U tube containing mercury, and causes a difference in level of the fluid columns in the two legs. The tube is supported upon knife edges so that it can tilt when the mercury shifts from one leg to another. The movement is transmitted by multiplying levers to a swinging arm carrying a weight, and said arm is swung out of its normally vertical position until the turning moment of the weight balances the moment caused by the displacement of the mercury in the legs of the U tube. The swinging arm is pivotally connected to a light pen which is movable lengthwise of a drum over which the recording paper strip is fed by a clock. In applying my present invention to this meter, I erect preferably upon the base plate thereof a standard carrying a train of registering wheels and dials. Means are provided for actuating said train, preferably at periodic intervals; and in addition to this I provide means whereby the extent of such actuation will be varied in correspondence with the angular positions assumed by the arm or other meter member. With this end in view, the registering train is driven by a friction clutch which is actuated by a vertically-movable rod. A cam or other device actuated by the shaft of the second hand of the clock reciprocates this rod at regular intervals and through a predetermined range by means of an intervening lever. Underneath the end of the rod-actuating lever I arrange a cam shaped stop adapted to arrest the movement of said rod at different points in its range of travel. The cam shaped stop has angular movement about a fixed center and is operatively connected with some movable portion of the meter so as to have a rate of angular displacement proportional to that of the tilting cups. In the embodiment I have shown, it takes the form of a curved arm attached to the swinging arm and lying in a plane of movement parallel with that of said arm. When there is no flow of fluid in the main, the curved stop sustains the lever at the highest limit of its travel and prevents it from dropping when the cam moves away from it. But when the arm swings aside under the influence of fluid flow in the main, the curved stop is carried with it. The curvature of said stop is carefully calculated to permit a certain increasing drop of the lever as the arm swings farther and farther from the vertical under an increasing consumption of fluid. The actuation of the registering train is therefore in correspondence with the fluid consumption; the hands moving faster over the dials as the consumption increases, and slowing down when the consumption drops. In any event, they indicate the total consumption in any given time as shown by the clock.

In the accompanying drawings, Figure 1 is a front elevation of a steam flow meter equipped with my integrating device. Fig. 2 is a side elevation, partly in section, of the integrating device, on a larger scale than Fig. 1. Fig. 3 is a front view of the parts shown in Fig. 2. Fig. 4 is a plan view of the rod-actuating lever. Fig. 5 shows the lever-actuating cam.

The mercury cups 1, connected by the tube 2, are carried by the yoke 3 which is suspended by knife-edges 4 on the bearing blocks 5. Connected with the cups are the flexible metallic tubes 6 through which the pressure differences set up in the nozzle are communicated to the mercury. A link 7 connects the yoke 3 with the short end of a lever 8 fulcrumed at 9 and connected at its other end by a link 10 with a short arm 11 projecting from the upper end of the arm 12. Knife-edges 13 support the arm 12, to whose lower end is pivoted the long light pen 14, counterbalanced by the weight 15 and resting upon the paper which is fed by the drum 16 driven by the clock 17 through the shaft 18'.

The integrating device which forms the subject matter of the present application comprises a train of ordinary registering wheels operating the hands 19 coöperating with the dials 20. The train is supported on a standard 21 erected on the base plate 22 of the instrument. On the driving shaft of the train is a friction-clutch actuating-device, preferably a drum 23 secured to the shaft and housing an actuator 24 loosely pivoted on the shaft. The periphery of said actuator lies close to the inner surface of the drum and has a plurality of inclined notches 25 in each of which is a small steel ball 26; the inside of the drum being grooved to form a ball race. When said actuator is moved in the forward direction, the balls jam between the actuator and the drum and force the latter to turn with said actuator and drive the train. When the actuator is turned in the opposite direction the balls are released and the actuator can be moved back without affecting the drum. This clutch is very sensitive, so that minute movements of the actuator will drive the train; movements so infinitesimal that a ratchet and pawl mechanism would not be affected by them.

To an arm 27 on the actuator is pivoted a rod 28, having a yoke 29 secured to its lower end. A block 30 is pivoted in said yoke and one end of a lever 31 is secured in said block. The lever is fulcrumed at 32 between two brackets 33 fastened to the standard 21. A roller 34 is mounted on the lever and rests normally upon a cam 35 mounted on the second-hand shaft 18' of the clock. This cam will therefore lift the lever 31 and pull down the rod 28 at regular intervals of time, preferably twice a minute, thereby causing the registering train to be driven by the actuator.

In order to render the lever 31 heavy enough to slightly overbalance the weight of the rod it is provided with a weight 36, adjustable lengthwise of the lever, preferably by making said weight a nut screwing on a threaded horizontal arm 37 secured to said lever. It is necessary, however, to prevent the lever 31 from being operated when no steam is flowing and the meter stands at zero, and yet to permit it to have a varying amount of movement in accordance with variations in steam flow, when the meter is in operation, in order that the dials may accurately indicate the total flow. With this object in view, I secure upon the arm 12 a curved arm or stop 38 and to the front end of the lever 31 there is attached a nose piece 39 under which the curved stop-arm moves lengthwise as the arm 12 swings to and fro. When the meter is at zero and the arm 12 hangs vertically, the nose 39 rests on a high portion of the stop 38 and supports the lever 31 at such a height that the cam 35 can turn freely without lifting or lowering said lever, as shown in the drawings. The registering train will therefore be stationary, indicating that no steam is flowing. But as the steam column begins to move and the arm 12 swings to the right in correspondence with the amount of flow, a lower portion of the curved arm is brought under the nose 39, so that as the cam revolves, the lever 31 can drop more or less at each half revolution. When the cam lifts the lever again it will actuate the registering train correspondingly. The curve of the stop-arm 38 is carefully laid out to secure an exact correspondence between the rate of registration and the rate of steam flow, so that the dials show a correct summing up of the total flow during the time that the meter is in operation. As the arm 12 swings farther to the right, the arm 38 permits the lever to make longer and longer strokes, until, at the position of maximum flow, the rod 28 is reciprocated to its fullest extent; this condition of things being indicated by the dotted lines in Figs. 1 and 3.

The cam 35 is so shaped that it lowers the lever 31 gradually thereby preventing it from striking the stop-arm with any violence and thus avoiding imparting any shock to the arm 12 and its connected mechanism. Nevertheless, when the stop-arm lies at an angle to the line of movement of the lever, there is danger that the arm 12 may be urged out of its proper position, thereby disturbing the record on the dials and on the paper feeding over the drum 16. To prevent this from happening, I provide a locking device which momentarily holds the arm from swinging at the instant the nose 39 strikes the stop-arm 38. This lock is preferably a lever 40 fulcrumed at 41 on one of the brackets 33 and having a sharp edge 42 at one end adapted to engage teeth cut in the upper edge of a quadrant 43 secured to the arm 12. The teeth are quite small, being preferably at least 100 to the inch. The quadrant is curved on the arc of a circle whose center is on the knife edge 13 on which the arm 12 swings. The opposite end of the lever carries a roller 44 which bears against a cam 45 on the shaft 18'. This cam is so shaped and arranged with reference to the cam 35 that the edge 42 will be dropped into engagement with the teeth on the quadrant 43 and remain there during each alternate quarter revolution of the shaft 18'. At or about the middle of each of said alternate quarter revolutions the cam 35 lowers the nose 39 gently into contact with the stop-arm 38, and in spite of the oblique position which the latter may occupy at that instant, the locking device restrains the arm 12 from movement. It will, therefore, be seen that during alternate quarter revolutions of the shaft 18' the metor is locked and the lever is lowered, and during the intervening quarter revolutions the integrating mechanism is actuated while the meter is left free to assume a new position, if there has been any change in the steam flow during the preceding quarter revolution. As the shaft 18' preferably makes one revolution a minute, the meter will be alternately locked and free for periods of fifteen seconds each.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is,—

1. An integrating mechanism for an instrument having a member movable in proportion to one of the factors of the quantity to be integrated comprising an element connected with said member and having angular movement about a given center, a registering mechanism, means for actuating it at periodic intervals, means whereby said actuation varies in correspondence with the angular positions assumed by said element, and means for automatically locking said element against movement at periodic intervals which bear a definite relation to the periodic intervals before mentioned.

2. An integrating mechanism for an instrument having a member movable in proportion to one of the factors of the quantity to be integrated comprising a swinging arm connected with said member, a registering mechanism, a lever for actuating it, means for oscillating the lever, a curved stop on the arm with which said lever contacts at each oscillation, and means for locking the arm when the lever makes contact with the stop.

3. An integrating mechanism for an instrument having a member movable in proportion to one of the factors of the quantity to be integrated comprising a swinging arm connected with said member, a registering mechanism, a lever for actuating it, means for oscillating the lever, a curved stop on the arm with which the lever comes in contact at each oscillation, a notched quadrant on the arm, and a locking lever engaging with the quadrant when the register-actuating lever engages the stop.

4. An integrating mechanism for an instrument having a member movable in proportion to one of the factors of the quantity to be integrated comprising a swinging arm connected with said member, a curved stop and a notched quadrant secured to the arm, registering mechanism, a lever for actuating it which is adapted to be arrested by the stop, a locking lever coöperating with the quadrant, a shaft, means for rotating the shaft, and cams on the shaft for controlling the movement of the levers.

5. An integrating mechanism for a fluid flow meter comprising a member having angular movement about a center, a registering mechanism, means for periodically actuating said mechanism, means controlled by said member for varying the extent of said actuation, and automatic means operated in synchronism with the first named means for periodically locking the member against movement.

6. An integrating mechanism for an instrument having a member movable in proportion to one of the factors of the quantity to be integrated comprising a stop which is positioned in accordance with the movements of said member, a registering mechanism, a movable element for actuating it, means for periodically moving said element, said element engaging said stop to limit the extent of its movement and means for locking the stop against movement when the element engages therewith.

In witness whereof, I have hereunto set my hand this 27th day of July, 1911.

AUSTIN R. DODGE.

Witnesses:
 BENJAMIN B. HULL,
 HELEN ORFORD.